United States Patent [19]

Rossbach et al.

[11] 4,324,465
[45] Apr. 13, 1982

[54] ARRANGEMENT FOR ADJUSTING COMPONENTS OF PHOTOGRAPHIC APPARATUS OR THE LIKE

[75] Inventors: Horst Rossbach, Eichenau; Eduard Wagensonner, Aschheim, both of Fed. Rep. of Germany

[73] Assignee: AGFA-Gevaert AG, Leverkusen, Fed. Rep. of Germany

[21] Appl. No.: 203,955

[22] Filed: Nov. 4, 1980

[30] Foreign Application Priority Data

Nov. 21, 1979 [DE] Fed. Rep. of Germany ....... 2946939

[51] Int. Cl.$^3$ ............................ G03B 3/10; G03B 7/10
[52] U.S. Cl. ...................................... 354/25; 318/616; 352/140; 352/141; 353/101; 354/42; 354/44; 354/195; 354/271
[58] Field of Search ................ 318/616, 617; 353/101; 352/140, 141; 354/25, 42, 44, 195, 271

[56] References Cited

U.S. PATENT DOCUMENTS

| | | | |
|---|---|---|---|
| 3,804,505 | 4/1974 | Wagensonner et al. | 353/101 |
| 3,896,461 | 7/1975 | Higuma | 354/271 X |
| 3,946,222 | 3/1976 | Swanberg | 353/101 X |
| 4,066,347 | 1/1978 | Wagensonner | 354/44 X |

Primary Examiner—Michael L. Gellner
Attorney, Agent, or Firm—Kontler & Grimes

[57] ABSTRACT

An electric motor which can drive the objective of a slide projector or which can adjust the blade or blades of a diaphragm receives signals from the output of an operational amplifier which receives first and second signals from a photosensitive transducer and a differentiating capacitor. The (second) signals from the capacitor are modified (first) signals from the transducer, and the combined intensity of first and second signals is such that the signals at the output of the amplifier reach a value which they would normally reach only when the component has already assumed a predetermined position before the motor can complete the movement of the component to such position. This allows for idling of the motor during the last stage of movement of the component to its predetermined position and/or for braking of the motor during such stage to ensure that the motor can rapidly advance the component during the major part of movement to the predetermined position and the component does not overshoot such position during the last stage of its movement.

25 Claims, 7 Drawing Figures

ARRANGEMENT FOR ADJUSTING COMPONENTS OF PHOTOGRAPHIC APPARATUS OR THE LIKE

BACKGROUND OF THE INVENTION

The present invention relates to arrangements or systems for adjusting certain components of photographic apparatus or the like, for example, to arrangements for adjusting the diaphragm of a camera or copying machine or to arrangements for focusing the objective of a slide projector so as to ensure that the image of a slide is properly imaged on the screen. More particularly, the invention relates to improvements in arrangements or systems wherein an electric motor is controlled by a circuit including at least one photosensitive element and serving to move the motor to an extent (e.g., through a given number of revolutions) such that the component or components which receive motion from the motor automatically assume predetermined optimum positions. Still more particularly, the invention relates to improvements in arrangements wherein the component or components which require adjustment vary the electrical value of the photosensitive element until the circuit including the photosensitive element assumes a balanced condition or state which corresponds to the desired predetermined optimum position of the adjustable (mobile) component or components.

OBJECTS AND SUMMARY OF THE INVENTION

An object of the invention is to provide an arrangement which can rapidly move one or more mobile or adjustable components to optimum positions without permitting any movements of such components beyond (i.e., overshooting of) the optimum positions.

Another object of the invention is to provide a simple and reliable arrangement for adjusting apertured diaphragms, lenses and/or other movable or adjustable components of photographic or like apparatus.

A further object of the invention is to provide the arrangement with novel and improved means for establishing an operative connection between an electric motor which adjusts one or more components of a photographic or like apparatus and a photosensitive element whose electrical value is variable by the component or components which are to be adjusted by the motor.

An additional object of the invention is to provide novel and improved means for adjusting the size of the aperture in the diaphragm of a photographic camera, copying machine or the like.

A further object of the invention is to provide novel and improved means for effecting linear movements of one or more optical components in a camera, projector or the like.

The invention resides in the provision of an arrangement for moving a component of a photographic apparatus or the like (e.g., the objective of a slide projector or the blade or blades of an apertured diaphragm) to a predetermined position. The arrangement comprises electric motor means (e.g., a small reversible electric motor) which is connected with and is operable to move the component, amplifier means (e.g., an operational amplifier which is connected with the secondary winding of a transformer by way of a rectifier circuit) having signal receiving input means and output means in circuit with the motor means and operative to transmit to the motor means signals each having an intensity which is a function of the intensity of the signals then applied to the input means (the motor means is responsive to signals from the output means to thereby move the component toward the predetermined position), means for monitoring the position of the component including photosensitive transducer means serving to generate first signals having intensities denoting the momentary positions of the component and to transmit such first signals to the input means of the amplifier means (the first signals can be altered during transmission to the input means but their intensity or another characteristic is proportional to or identical with the intensity of signals which are generated by the transducer means as a function of the position of the component), and a differential capacitor or other suitable means for converting the first signals into modified second signals and for applying such second signals to the input means of the amplifier means so that (owing to the simultaneous application of first and second signals to the input means of the amplifier means) the intensity of signals which are transmitted by the output means of the amplifier means reaches a value corresponding to the value which is required to cause the motor means to move the component to the predetermined position before the motor means actually completes the movement of the component to such predetermined position. This means that the last stage of movement of the component to its predetermined position can be caused by the motor means while the motor means continues to rotate its output element due to inertia. It is also possible to brake the motor means during the interval between the instant of transmission thereto of a signal having the aforementioned value and the instant when the component actually assumes the predetermined position so that the motor means can be caused to rapidly advance the component close to the predetermined position and to thereupon advance the component at a reduced speed during the last stage of movement of the component to its predetermined position.

The arrangement preferably further comprises voltage divider means connected between the monitoring means and the input means of the amplifier means. The voltage divider means includes resistor means connected between the transducer means and the input means, and the modifying means then includes the aforementioned differentiating capacitor means connected in parallel with the resistor means. The electrical values of the resistor means and of the capacitor means can be selected in such a way that the intensity of signals which are transmitted to the motor means reaches the aforementioned value a preselected interval of time prior to completion of movement of the component to its predetermined position. The amplifier means connects the source of electrical energy (e.g., the aforementioned rectifier circuit) with the motor means until the intensity of signals at the output of the amplifier means reaches the aforementioned value; the aforediscussed interval then preferably corresponds to that which is required to complete the movement of the component to its predetermined position owing to inertia of the motor means (i.e., owing to movement of the output element of the motor means subsequent to disconnection of the motor means from the energy source).

The idling amplification factor of the amplifier means is preferably in excess of 100, and the amplifier means is preferably designed in such a way that, during feedback operation of the amplifier means below a predetermined input voltage, the amplification factor decreases nonlinearly from an upper amplification factor to one in response to a reduction of the input voltage. The amplification factor of the amplifier means can be selected by a voltage divider including a resistor (whose ohmic resistance is preferably in excess of 1 kΩ) and two antiparallel-connected diodes.

The novel features which are considered as characteristic of the invention are set forth in particular in the appended claims. The improved arrangement itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
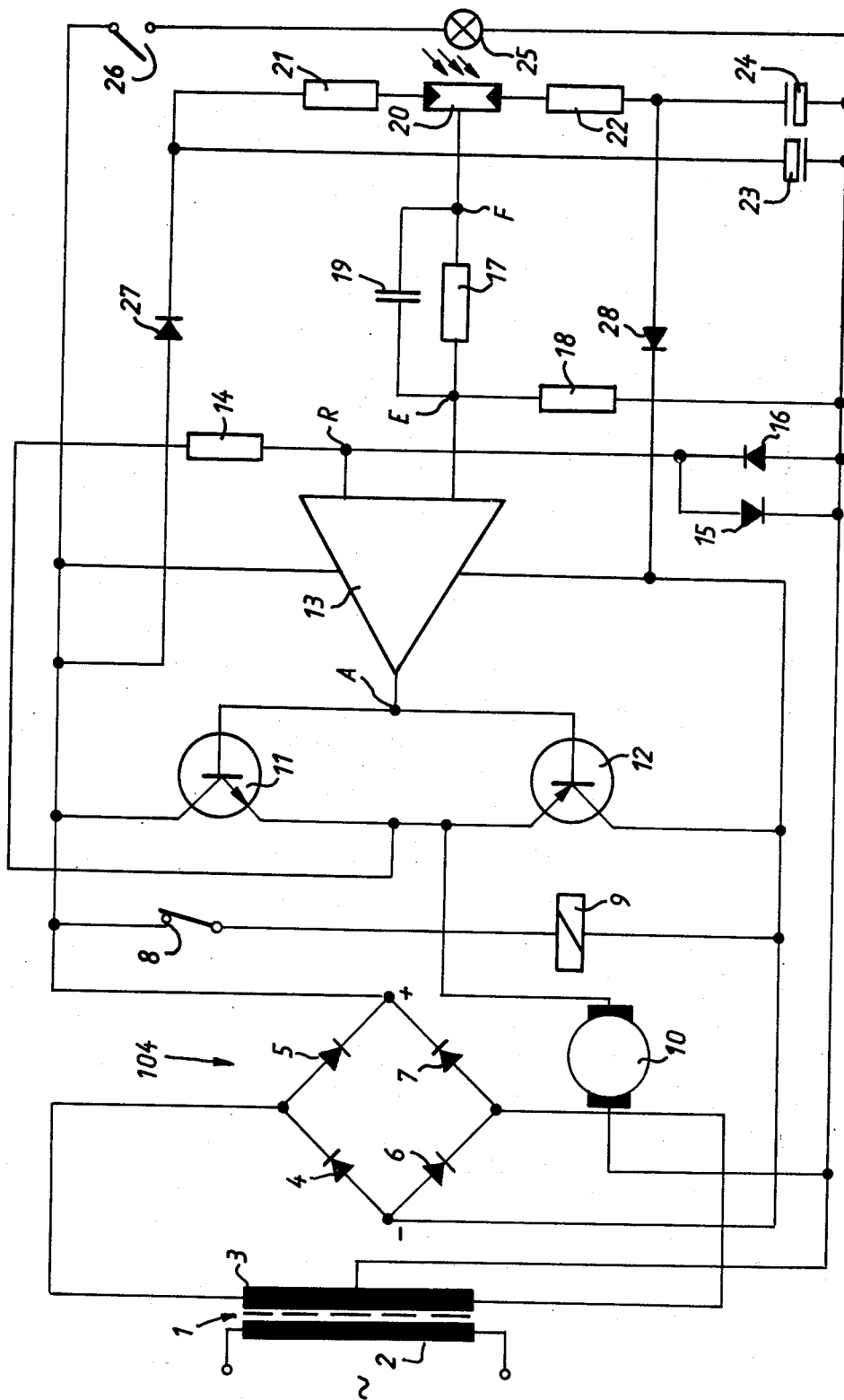
FIG. 1 is a diagram of a circuit forming part of an arrangement which embodies one form of the invention and employs a twin or dual photosensitive transducer.

The circuit of FIG. 1 comprises a transformer 1 including a primary winding 2 which is connected with a source (not shown) of a-c current and a secondary winding 3 which is connected to a rectifying bridge circuit 104 including four diodes 4, 5, 6 and 7. The d-c voltage which is generated by the rectifying circuit 104 is applied to the corresponding inputs of an operational amplifier 13. A relay 9 can be connected with the rectifying circuit 104 in response to closing of a switch 8. A small reversible d-c motor 10 is connected with the emitters of two transistors 11 and 12 which are connected in series and complement each other.

The bases of the transistors 11 and 12 are connected with the output A of the operational amplifier 13 whose inverting input R is connected with a voltage divider including a resistor 14 and two antiparallel-connected diodes 15, 16. The voltage divider 14–16 selects the amplification factor of the amplifier 13. The resistance of the resistor 14 preferably exceeds 1 kΩ and this resistor constitutes a feedback resistor for the operational amplifier 13. The input R is a tap between the resistor 14 and diodes 15, 16. That terminal of the resistor 14 which is remote from the inverting input R of the amplifier 13 is connected with the emitters of the transistors 11 and 12. The motor 10 and the diodes 15, 16 are further connected to an intermediate terminal of the secondary transformer winding 3, the same as a further resistor 18, two capacitors 23, 24, and one terminal of a light source 25.

The non-inverting (signal admitting) input E of the operational amplifier 13 is connected with a voltage divider including a resistor 17 and the aforementioned resistor 18. The resistor 17 is connected in parallel with a differentiating (signal modifying or converting) capacitor 19 which, too, forms part of the just mentioned voltage divider. A tap F between the resistor 17 and capacitor 19 is further connected with the central contact of a photosensitive transducer 20. The latter forms part of a monitoring means including an additional voltage divider which further includes two resistors 21 and 22. The light source 25 emits radiation (directly or indirectly) against the transducer 20 (see FIG. 6) in response to closing of a master switch 26 which is further connected with the rectifying circuit 104. The aforementioned capacitor 23 is connected with the rectifying circuit 104 by way of a diode 27 which is further in circuit with the voltage divider 20–22. The capacitor 24 is connected with the voltage divider 20–22 as well as with the rectifying circuit 104 by way of a diode 28.

Figure 6:
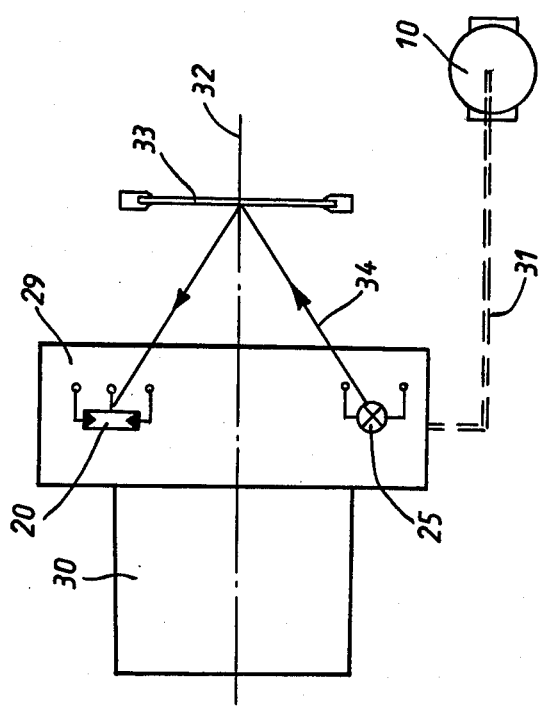
FIG. 6 is a diagrammatic view of a portion of an arrangement which constitutes an automatic focusing device for use in a slide projector and embodies the circuit of FIG. 1.

As shown in FIG. 6, the transducer 20 and the light source 25 are mounted on a holder or carrier 29 for an objective 30 in a slide projector. The motor 10 can reciprocate the holder 29 in the direction of the optical axis 32 of the objective 30 through the medium of an operative connection 31 (e.g., a gear train, a ratchet-and-pinion drive or the like) which is indicated by broken lines. Radiation 34 which issues from the light source 25 impinges upon and is reflected by a diapositive or slide 33 which is placed into register with the objective 30. The purpose of the arrangement including the circuit of FIG. 1 is to move the holder 29 until the image of the slide 33 is properly focused on a screen or the like, i.e., the arrangement is designed to effect stoppage of the motor 10 when the objective 30 (adjustable component) is located in a predetermined position at a certain optimum distance from the plane of the slide 33. It will be noted that the motor 10, the transducer 20, the light source 25 and the holder 29 constitute an automatic focusing means for use in a slide projector. The transducer 20 and light source 25 need not be mounted directly on the holder 29; for example, they can be mounted on any other part which shares the movements of the objective 30 as long as the (first) signals which the transducer 20 transmits to the input E via resistor 17 of the voltage divider 17–19 vary as a function of changes in the position of the objective 30. The motor 10 should be arrested to maintain the objective 30 in an optimum (predetermined) position for satisfactory focusing of the image of the slide 33 on a screen or the like when the radiation 34 effects equal illumination of both halves of the twin or dual photosensitive transducer 20.

Figure 2:
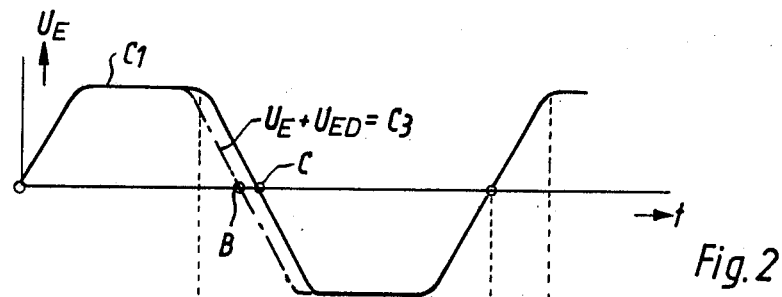
FIG. 2 is a diagram showing theoretical variations of voltage as a function of time at the signal receiving input of an amplifier in the circuit of FIG. 1.

The operation of the circuit of FIG. 1 will be described in greater detail with reference to FIGS. 2 and 5. FIG. 2 shows a system of coordinates wherein the intensity of (first) voltage signals ($U_E$) generated by the transducer 20 and applied to the non-inverting input E of the operational amplifier 13 is measured along the ordinate and the time (t) is measured along the abscissa. The intensity $U_E$ varies in response to back-and-forth movements of the holder 29 along the optical axis 32 of the objective 30 shown in FIG. 6. It is assumed that the holder 29 (e.g., a tubular carriage for the objective 30) is moved from a first end position to a second end position and back to the first end position. The curve C1 of FIG. 2 represents variations of the intensity of voltage $U_E$ which is applied to the input E of the amplifier 13 by the transducer 20 via resistor 17 in response to such back-and-forth movements of the holder 29 and objective 30 (as mentioned above, such movements of the holder 29 are shared by the light source 25 and photosensitive transducer 20). It will be noted that the curve C1 includes trapezoidal sections.

Figure 3:
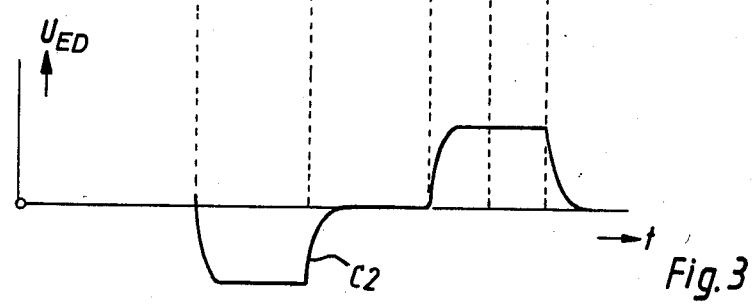
FIG. 3 is a diagram showing actual variations of voltage as a function of time at the same input of the amplifier in the circuit of FIG. 1.

In the coordinate system of FIG. 3, the intensity of voltage $U_{ED}$ is measured along the ordinate and the time is measured along the abscissa. The curve C2 of FIG. 3 represents the intensity of that voltage $U_{ED}$ which is obtained by differentiation (modification) of the intensity represented by the trapezoidal curve C1 of FIG. 2. The voltage $U_{ED}$ is negative in the region of the downwardly sloping flanks of the trapezoidal portions or sections of the curve C1 and is positive in the region of the upwardly sloping flanks of the curve C1.

The total voltage which is applied to the input E of the operational amplifier 13 equals the sum of the voltage (first and second signals) $U_E$ and $U_{ED}$. This is indicated in FIG. 2 by a phantom line (curve C3). FIG. 2 further shows that the circuit of FIG. 1 acquires a state of equilibrium at the instant which is denoted by the circle B, i.e., where the curve C3 intersects the abscissa. On the other hand, the instant at which the arrangement which embodies the circuit of FIG. 1 acquires a state of equilibrium (i.e., when the objective 30 is at a predetermined optimum distance from the slide 33 shown in FIG. 6) follows the instant B (the instant at which the arrangement acquires a state of equilibrium is denoted by the circle C, i.e., by the point where the downwardly sloping flank of the curve C1 intersects the abscissa). Thus, the balanced state is simulated earlier than it actually occurs. By appropriate selection of electrical values of the resistors 17, 18 and differentiating capacitor 19 (converting or modifying means), the delay between the occurrence of simulated and actual states of equilibrium (i.e., the distance between the points B and C on the abscissa of the system shown in FIG. 2) can be selected within a reasonably wide range. The advantages of such achievement of a state of simulated equilibrium ahead of the state of actual equilibrium will be explained hereinbelow.

Figure 4:
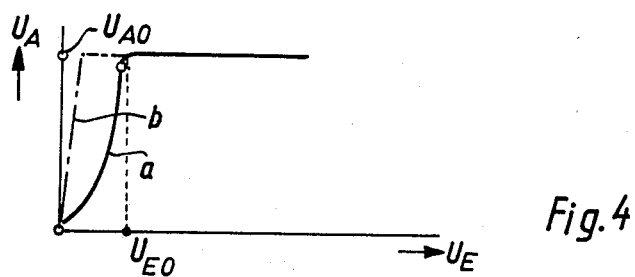
FIG. 4 is a diagram showing fluctuations of voltage at the output of the amplifier as a function of voltage fluctuations at the input of the amplifier.

FIG. 4 is a diagram wherein the voltage $U_A$ at the output A of the operational amplifier 13 is measured along the ordinate and the voltage $U_E$ at the input E is measured along the abscissa. It will be noted that the voltage $U_A$ is a function of the voltage $U_E$. The voltage $U_A$ rises exponentially from the zero point at an angle of approximately 45 degrees and reaches a maximum value (UAO) when the value of the voltage $U_E$ reaches UEO (curve a in FIG. 4). If the voltage $U_E$ increases beyond UEO, the voltage $U_A$ remains at the maximum value UAO. This is the state of saturation of the operational amplifier 13. When the voltage $U_E$ equals zero, the amplification factor of the amplifier 13 equals one.

If the diodes 15 and 16 of the circuit arrangement of FIG. 1 were replaced by a resistor, the amplification factor of the amplifier 13 would be constant. This is represented by the phantom-line curve b of FIG. 4. In such arrangement, the voltage $U_A$ at the output A of the amplifier 13 would increase linearly with the voltage $U_E$ at the input E. This means that the amplifier 13 would reach the state of saturation earlier than if the circuit of FIG. 1 employs the diodes 15 and 16, i.e., the voltage $U_A$ would reach the maximum value UAO in response to an increase of voltage $U_E$ to a value which is somewhere between zero and UEO. This can be readily seen in FIG. 4.

Figure 5:
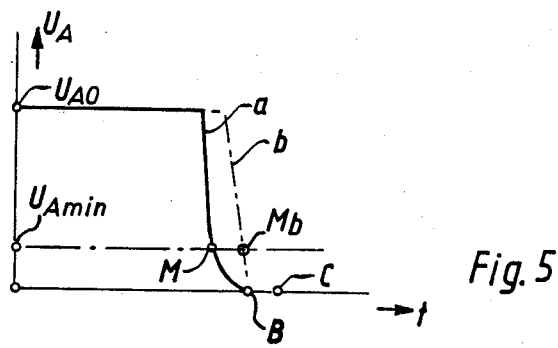
FIG. 5 is a diagram showing fluctuations of voltage at the output of the amplifier as a function of time.

FIG. 5 illustrates the manner in which the output voltage $U_A$ of the operational amplifier 13 varies as a function of time (time is measured along the abscissa and the voltage $U_A$ is measured along the ordinate). in the course of focusing movement of the holder 29 with the objective 30 and parts 20, 25 of the circuit of FIG. 1, voltage $U_A$ at the output A of the amplifier 13 at first remains at the value UAO. If the voltage at the input E drops below the value UEO, voltage $U_A$ at the output A of the amplifier 13 decreases exponentially and reaches zero at the instant B. If the characteristic curve a of the amplifier 13 decreases below the value $U_A$min at the instant M, the motor 10 ceases to be positively driven. The interval between the instants M and C is then available for running out of the motor 10. Genuine balancing or state of equilibrium (proper focusing of the image of the slide 33 on a screen or the like) is reached at the instant C. If the diodes 15 and 16 were replaced by a resistor, the characteristic curve of the amplifier 13 would equal or approximate the phantom-line curve b of FIG. 5. It will be readily seen that the interval between M and C is longer than the interval between Mb and C, i.e., the provision of diodes 15, 16 is advantageous and desirable because it allows for a longer interval of time during which the motor 10 can be decelerated from a relatively high speed to zero speed. The improved arrangement can move the objective 30 to the predetermined optimum position within a fraction of the interval which is needed in conventional focusing systems. Moreover, the improved arrangement ensures that the objective 30 does not overshoot the predetermined position (i.e., it need not be moved backwards) because the signal ($U_A$) having that intensity which is needed to cause the motor 10 to move the objective 30 to predetermined position is terminated (at the instant M) before the motor 10 completes the movement of the objective 30 to the desired position (instant C).

An important advantage of the improved arrangement is that the signals which are generated by the capacitor 19 (i.e., modified signals transmitted by the central contact of the transducer 20) are superimposed upon the signals which are generated by the transducer. Therefore, the signals at the output A of the amplifier 13 reach a value (see the instant M in the diagram of FIG. 5) which they should reach on arrival of the objective 30 to predetermined position before the motor 10 completes the movement of the objective to such position. Completion of movement of objective 30 to its predetermined position takes place at the instant C (FIG. 5). In fact, and as can be readily seen in FIGS. 2–5, the signal which is transmitted to the motor 10 after the instant M is of such nature that it tends to reverse the direction of rotation of the output element of the motor. This produces a desirable braking action. However, the inertia of moving parts of the motor 10 suffices to maintain the objective 30 in motion in a direction toward the predetermined position (during the interval between M and C). As explained above, the interval between the instants M and C can be readily selected (by appropriate selection of electrical values of the elements 17, 18 and 19) in such a way that the motor 10 comes to a full stop at the instant C even if the speed of the motor prior to the instant M was high or very high. This renders it possible to complete the movement of the objective 30 to its predetermined position within a surprisingly short period of time which is a small or very small fraction of the period required in conventional slide projectors with automatic focusing means.

The resistor 17 transmits the analog value of the signal from the transducer 20 to the input E of the amplifier 13. At the same time, the resistor 17 cooperates with the capacitor 19 to enable the latter to perform its signal converting or modifying function.

The idling amplification of the operational amplifier 13 is preferably in excess of 100. During feedback operation of the amplifier 13 below a predetermined input voltage, the factor of amplification decreases non-linearly from an upper amplification factor to one in response to a reduction of the input voltage. All this can be seen in FIGS. 2 to 5. As explained above, were the amplification factor constant (i.e., if the diode 15,16 were replaced with a conventional resistor), the output voltage $U_A$ would decrease linearly as a function of decreasing input voltage (in the lower range of input voltages). The amplifier 13 assumes the state of saturation when the output voltage $U_A$ reaches a maximum value. An advantage of the diodes 15, 16 is that the amplification factor of the amplifier 13 decreases non-linearly (to the aforementioned value of one) when the input value decreases below a preselected voltage. Consequently, the amplifier 13 assumes a state of saturation in response to a relatively high input voltage. This means that the output voltage begins to decrease earlier, i.e., the instant M is reached sooner than if the diodes 15,16 were replaced by a resistor. As explained above, the motor 10 ceases to receive energy which would tend to effect a further movement of the objective 30 toward its predetermined position as soon as the instant M is reached, i.e., the motor 10 is thereupon in a state of idling or is braked to ensure that the objective 30 is arrested at the instant C.

The interval of braking of the motor 10 preparatory to full stoppage of the objective 30 can be said to consist of two sections and is terminated at the instant C. The first section is attributable to the signal converting or modifying action of the differentiating capacitor 19 (simulation of a condition of equilibrium). The other section is the so-called interval of dead-center position of the motor. Owing to such advancement of the instant of stoppage of the motor 10, the normal speed of the motor (prior to the instant M) can be increased still further with the attendant advantage of rapid focusing of the image of a slide on the screen.

Figure 7:
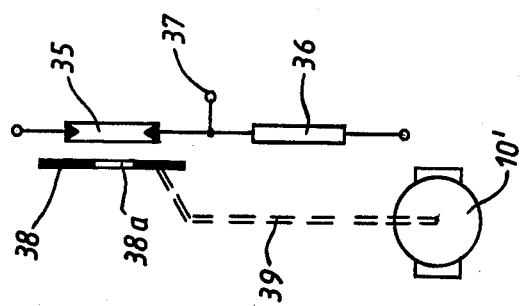
FIG. 7 is a fragmentary schematic view of a second arrangement which serves to adjust the size of the aperture of a diaphragm and utilizes a circuit which constitutes a simplified version of the circuit shown in FIG. 1.

FIG. 7 illustrates a portion of a modified arrangement wherein the reversible electric motor 10' is connected with an apertured diaphragm (movable component) 38 by way of a gear train, a rack-and-pinion drive or another suitable operative connection 39 (indicated schematically by broken lines). The dual or twin photosensitive transducer (resistor) 20 of FIGS. 1 and 6 is replaced with a simple transducer 35 which forms part of a voltage divider further including a resistor 36. The tap 37 between the series-connected transducer 35 and resistor 36 is connected with the tap F of FIG. 1. Thus, the voltage divider 35, 36 of FIG. 7 replaces the monitoring means 20–22 of FIG. 1. In all other respects, the operation of the arrangement which embodies the structure of FIG. 7 is identical or clearly analogous to that of the arrangement embodying the structure of FIG. 6 and the circuit of FIG. 1. The diaphragm 38 can be used in a camera, in a copying machine or in any other machine or apparatus which requires automatic adjustment of the aperture. The transducer 35 is exposed to light which passes through the aperture 38a of the diaphragm 38, i.e., the intensity of first signals $U_E$ varies as a function of changes in the position of the blade or blades of the diaphragm 38.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. An arrangement for moving a component of photographic apparatus or the like to a predetermined position, comprising electric motor means connected with and operable to move said component; monitoring means for monitoring the position of said component and generating primary signals having primary magnitudes indicative of the instantaneous position of said component; and circuit means establishing a path for transmission of said primary signals to said motor means to thereby regulate said motor means in response to said primary signals, said circuit means including modifying means for modifying said primary signals so as to produce modified signals having modified magnitudes such that said monitoring means generates a primary signal indicative of said predetermined position at a preselected time interval before completion of movement of said component to said predetermined position.

2. The arrangement of claim 1, comprising voltage divider means connected between said monitoring means and said motor means, said voltage divider means including resistor means connected between said monitoring means and said motor means and said modifying means including differentiating capacitor means connected in parallel with said resistor means.

3. The arrangement of claim 2, wherein the electrical values of said resistor means and said capacitor means determine said preselected interaval.

4. The arrangement of claim 1, comprising amplifier means having input means arranged to receive said modified signals and output means arranged to transmit said modified signals to said motor means after amplification.

5. The arrangement of claim 4, comprising selecting means for selecting the amplification factor of said amplifier means, said selecting means including resistor means having a high ohmic resistance and a pair of anti-parallel diodes connected with said resistor means.

6. The arrangement of claim 5, comprising a feedback circuit for said amplifier means; and wherein said input means includes an inverting input and said resistor means is located in said feedback circuit and is connected with said inverting input, said resistor means and said diodes being connected in series.

7. The arrangement of claim 6, wherein said ohmic resistance is in excess of 1 k$\Omega$.

8. The arrangement of claim 4, comprising a source of electrical energy, said amplifier means being arranged to connect said source with said motor means until said preselected interval, said preselected interval corresponding to that which is required to complete the movement of said component to said predetermined position owing to inertia of said motor means.

9. The arrangement of claim 4, wherein said amplifier means has an idling amplification factor in excess of 100.

10. The arrangement of claim 4 wherein, during feedback operation of said amplifier means below a predetermined input voltage, the amplification factor thereof decreases non-linearly from an upper amplification factor to one in response to a reduction of said input voltage.

11. The arrangement of claim 10, comprising means for selecting said amplification factor.

12. The arrangement of claim 1, wherein said monitoring means comprises photosensitive transducer means.

13. The arrangement of claim 12, wherein said component is the objective of a slide projector.

14. The arrangement of claim 13, comprising a light source arranged to direct light against a slide in said projector whereby the slide reflects light upon said transducer means, said source and said transducer means being arranged to share the movements of said objective.

15. The arrangement of claim 13, wherein said transducer means comprises a twin photosensitive resistor.

16. The arrangement of claim 12, wherein said component is an apertured diaphragm.

17. The arrangement of claim 16, wherein said diaphragm is located in front of said transducer means so that the amount of light which impinges upon said transducer means is a function of the size of the aperture which is defined by said diaphragm, said motor means being arranged to vary the size of such aperture.

18. The arrangement of claim 16, wherein said transducer means comprises a single photosensitive resistor.

19. The arrangement of claim 4, comprising a source of electrical energy and means for connecting said source with said amplifier means.

20. The arrangement of claim 19, wherein said source includes a rectifier circuit.

21. An arrangement for moving a component of photographic apparatus or the like to a predetermined position, comprising electric motor means connected with and operable to move said component; amplifier means having signal receiving input means and output means in circuit with said motor means and operative to transmit to said motor means signals each having an intensity which is a function of the intensity of the signal then applied to said input means, said motor means being responsive to signals transmitted by said output means to thereby move said component towards said predetermined position, and said amplifier means having an idling amplification factor in excess of 100 which decreases non-linearly during feedback operation of said amplifier means below a predetermined input voltage from an upper amplification factor to one in response to a reduction of said input voltage; means for selecting said amplification factor, said selecting means comprising voltage divider means including resistor means having a high ohmic resistance and two anti-parallel connected diodes; means for monitoring the position of said component including photosensitive transducer means arranged to generate first signals having intensities denoting the momentary positions of said component and to transmit said first signals to said input means; and means for converting said first signals into modified second signals and for applying said second signals to said input means so that the intensity of signals transmitted by said output means reaches a value corresponding to that which is required to cause said motor means to move said component to said predetermined position before said motor means completes the movement of said component to such predetermined position.

22. The arrangement of claim 21, wherein said ohmic resistance is in excess of 1 k$\Omega$.

23. The arrangement of claim 21, wherein said amplifier means comprises an operational amplifier.

24. The arrangement of claim 23, wherein said input means includes an inverting input constituting a tap between said diodes and said resistor means of said voltage divider means.

25. The arrangement of claim 24, wherein said input means further includes a non-inverting input which receives said first and second signals.

* * * * *